US012655762B2

(12) United States Patent
Yan et al.

(10) Patent No.: US 12,655,762 B2
(45) Date of Patent: Jun. 16, 2026

(54) DUAL-POWER HYDRAULIC ROOF BOLTER

(71) Applicant: HEBEI JINGLONG INTELLIGENT EQUIPMENT CO., LTD., Langfang (CN)

(72) Inventors: Zilong Yan, Langfang (CN); Qi Liu, Langfang (CN); Xin Zhang, Langfang (CN); Hao Liu, Langfang (CN); Mingzheng Wu, Langfang (CN); Shuai Yu, Langfang (CN); Xudong Wang, Langfang (CN)

(73) Assignee: HEBEI JINGLONG INTELLIGENT EQUIPMENT CO., LTD., Langfang (CN)

( * ) Notice: Subject to any disclaimer, the term of this patent is extended or adjusted under 35 U.S.C. 154(b) by 102 days.

(21) Appl. No.: 18/713,623

(22) PCT Filed: May 30, 2022

(86) PCT No.: PCT/CN2022/096003
§ 371 (c)(1),
(2) Date: May 24, 2024

(87) PCT Pub. No.: WO2023/092974
PCT Pub. Date: Jun. 1, 2023

(65) Prior Publication Data
US 2025/0027413 A1     Jan. 23, 2025

(30) Foreign Application Priority Data

Nov. 25, 2021     (CN) ......................... 202111416138.6

(51) Int. Cl.
*E21D 20/00*          (2006.01)
*B60L 50/60*          (2019.01)
(Continued)

(52) U.S. Cl.
CPC ............ *E21D 20/003* (2013.01); *B60L 50/60* (2019.02); *E21B 7/026* (2013.01); *E21B 7/027* (2013.01);
(Continued)

(58) Field of Classification Search
CPC .......... E21B 7/025; E21B 7/026; E21B 7/027; E21D 20/003; F03D 9/28; F03D 9/25;
(Continued)

(56) References Cited

U.S. PATENT DOCUMENTS 3,951,215 A     4/1976  Galis
4,753,078 A *   6/1988  Gardner, Jr. ............ F01K 15/02
                                                      60/668
(Continued)

FOREIGN PATENT DOCUMENTS

CN        201056984 Y     5/2008
CN        102418540 A     4/2012
(Continued)

OTHER PUBLICATIONS

The search report of CN application No. 202111416138.6 issued on Oct. 30, 2024.

*Primary Examiner* — Carib A Oquendo
(74) *Attorney, Agent, or Firm* — The Sun IP Law

(57)          ABSTRACT

Some embodiments of the present disclosure provides a dual-power hydraulic roof bolter, which includes an electric vehicle chassis, a machine base part, a drill boom mechanism, a bolting machine, a working platform set, an operating platform and a hydraulic system, and the hydraulic system is connected with the electric vehicle chassis, the drill boom mechanism, the bolting machine, the working platform set and the operating platform to control accordingly actions, the electric vehicle chassis is provided with the machine base part, the machine base part is provided (Continued)

with the drill boom mechanism, and the drill boom mechanism is provided with the bolting machine, the working platform set and the operating platform; the hydraulic system is independently driven by two sets of power sources respectively, and the two sets of power sources are an electric vehicle chassis transfer case driving hydraulic pump and a wind motor driving hydraulic pump respectively.

18 Claims, 6 Drawing Sheets

(51) Int. Cl.
| | | |
|---|---|---|
| *E21B 7/02* | (2006.01) | |
| *E21F 17/18* | (2006.01) | |
| *F03D 9/28* | (2016.01) | |
| *F15B 15/18* | (2006.01) | |

(52) U.S. Cl.
CPC ................ *E21F 17/18* (2013.01); *F03D 9/28* (2016.05); *F15B 15/18* (2013.01)

(58) Field of Classification Search
CPC .. B60L 50/60; B60L 1/003; B60L 8/00; E21F 17/18; F15B 15/18
See application file for complete search history.

(56) References Cited

U.S. PATENT DOCUMENTS

| | | | | |
|---|---|---|---|---|
| 9,243,384 | B2 * | 1/2016 | Yamashita | ............... F15B 21/14 |
| 2002/0153178 | A1 * | 10/2002 | Limonius | ................ B60L 8/003 |
| | | | | 180/2.2 |

| | | | | |
|---|---|---|---|---|
| 2005/0103509 | A1 | 5/2005 | Barthomeuf et al. | |
| 2007/0036617 | A1 | 2/2007 | Oldsen et al. | |
| 2009/0236156 | A1 * | 9/2009 | Promersberger | .... H01M 16/006 |
| | | | | 429/418 |
| 2010/0119310 | A1 | 5/2010 | Yan | |
| 2011/0182672 | A1 | 7/2011 | Nystrom | |
| 2013/0214928 | A1 * | 8/2013 | Kuittinen | .............. B60W 30/18 |
| | | | | 175/57 |
| 2015/0107914 | A1 * | 4/2015 | Zhao | ....................... B60L 50/15 |
| | | | | 180/2.2 |
| 2015/0266382 | A1 * | 9/2015 | Penmetsa | ................... B60L 1/14 |
| | | | | 307/10.1 |
| 2017/0152745 | A1 * | 6/2017 | Stec | ......................... E21C 27/24 |
| 2018/0244161 | A1 * | 8/2018 | Nguyen | ................... B60L 1/02 |
| 2020/0208519 | A1 * | 7/2020 | Pu | ............................. E21D 9/12 |

FOREIGN PATENT DOCUMENTS

| | | |
|---|---|---|
| CN | 104196443 A | 12/2014 |
| CN | 104818945 A | 8/2015 |
| CN | 105350910 A | 2/2016 |
| CN | 105525926 A | 4/2016 |
| CN | 107401418 A | 11/2017 |
| CN | 207761662 U | 8/2018 |
| CN | 110513039 A | 11/2019 |
| CN | 112049656 A | 12/2020 |
| CN | 113958350 A | 1/2022 |
| CN | 216974891 U | 7/2022 |

* cited by examiner

DUAL-POWER HYDRAULIC ROOF BOLTER

CROSS-REFERENCE TO RELATED DISCLOSURE

The present disclosure is a national stage disclosure of International Patent Application No. PCT/CN2022/096003, which is filed on May 30, 2022, and claims priority to Chinese Patent Application No. 202111416138.6, filed on Nov. 25, 2021, and entitled "Dual-Power Hydraulic Roof Bolte", the contents of which are hereby incorporated by reference in its entirety.

TECHNICAL FIELD

The present disclosure relates to the field of roof bolters, and relates to a dual-power hydraulic roof bolter.

BACKGROUND

At present, roadway excavation in large and medium-sized coal mines mostly adopts a bolt and cable support operation mode, and roadway repair and supplementary driving of bolts and cables are mostly constructed by a manual operation mode. Usually, the bolt on the upper side of a roadway needs to be erected with a rack for operation, the operation efficiency is low and the operation safety is poor.

In addition, most of the existing coal mine vehicle chassis are explosion-proof diesel engine trackless rubber-tyred vehicles, which have loud noise and high harmful gas emission, and do not conform to a development concept of a green and low-carbon technology.

Thus, the existing rock bolter obviously still has inconveniences and defects in structure, method and use, and needs to be further improved urgently. How to create a new dual-power hydraulic roof bolter, which uses wind and electricity clean energy as a power source, is low in noise and zero in pollution emission, and achieves a green and low-carbon environmental protection concept, and a bolting machine of which can be adjusted up and down, left and right, front and back in all directions, so as to greatly improve the operation range, reduce the labor intensity of workers and improve the safety and the operation efficiency, has become a goal that the current industry is badly in need of improvement.

SUMMARY

Some embodiments of the present disclosure provide a dual-power hydraulic rock bolter, the dual-power hydraulic rock bolter uses wind and electricity clean energy as a power source which is low in noise and zero in pollution emission and achieves a green and low-carbon environmental protection concept, and a bolting machine can be adjusted up and down, left and right, front and back in all directions, so as to greatly improve the operation range, reduce the labor intensity of workers and improve the safety and the operation efficiency, thereby overcoming the defects of the existing roof bolter.

In order to solve the above-mentioned technical problem, the present disclosure provides a dual-power hydraulic roof bolter, which includes an electric vehicle chassis, a machine base part, a drill boom mechanism, a bolting machine, a working platform set, an operating platform and a hydraulic system. The hydraulic system is connected with the electric vehicle chassis, the drill boom mechanism, the bolting machine, the working platform set and the operating platform to control the actions of the electric vehicle chassis, the drill boom mechanism, the bolting machine, the working platform set and the operating platform, the electric vehicle chassis is located at the bottom of the bolter, and provided with the machine base part, the machine base part is provided with the drill boom mechanism, and the drill boom mechanism is provided with the bolting machine, the working platform set and the operating platform. The hydraulic system is independently driven by two sets of power sources respectively, and the two sets of power sources are an electric vehicle chassis transfer case driving hydraulic pump and a wind motor driving hydraulic pump respectively.

In some embodiments, the drill boom mechanism includes a drill boom rotary seat, a drill boom scalable set, a strut scalable set and a lifting platform. The drill boom rotary seat is rotatably mounted on the machine base part, first ends of the drill boom scalable set and the strut scalable set are both connected with the drill boom rotary seat through a first pin shaft, second ends of the drill boom scalable set and the strut scalable set are both connected with the lifting platform through a second pin shaft, the drill boom scalable set and the strut scalable set are provided in parallel.

In some embodiments, the drill boom scalable set and the strut scalable set form a lifting adjustment set with the drill boom rotary seat and the lifting platform, and the lifting adjustment set is parallelogram-shaped.

In some embodiments, the lifting adjustment set achieves lifting adjustment through a drill boom support oil cylinder.

In some embodiments, the bolting machine is rotatably provided on the lifting platform by a swing cylinder, and a drill boom swing cylinder is further provided between the drill boom scalable set and the machine base part, and the drill boom swing cylinder drive the drill boom rotary seat and the lifting adjustment set to rotate, so as to drive the bolting machine to rotate.

In some embodiments, the lifting platform is a platform scalable set, and the bolting machine, the working platform set and the operating platform are all provided on an extended platform of the platform scalable set.

In some embodiments, the working platform set includes a fixed platform, a left overturning platform and a right overturning platform. The left overturning platform and the right overturning platform are respectively rotatably provided on two sides of the fixed platform, edges of the right overturning platform and the left overturning platform are both provided with a right guard rail and a left guard rail, the fixed platform is provided on the platform scalable set.

In some embodiments, the right overturning platform and the left overturning platform are overturned by folding oil cylinders.

In some embodiments, ends of the right overturning platform and the left overturning platform are provided with telescopic platforms, and the telescopic platforms are horizontally expanded and contracted through telescopic cylinders.

In some embodiments, upper ends of the right guard rail and the left guard rail are provided with lifting rails.

In some embodiments, the dual-power hydraulic roof bolter further includes a bin set provided on the electric vehicle chassis.

In some embodiments, the electric vehicle chassis is a mine explosion-proof lithium ion battery trackless rubber-tyred vehicle chassis, and a power system of the electric vehicle chassis is provided with an energy consumption braking functional module and a downhill control operation module.

In some embodiments, the electric vehicle chassis further includes an automatic gas detection and alarm module connected with the power system.

After adopting such a design, the present disclosure has at least the following advantages.

1. The dual-power hydraulic roof bolter in the present disclosure uses the wind and electricity clean energy as the power, and is provided with the two sets of power sources which are independently driven, so as to overcome the problems of loud noise and high harmful gas emission of the existing explosion-proof diesel engine trackless rubber-tyred vehicle chassis, and achieve low noise and zero pollution emission. The dual-power hydraulic roof bolter is configured to repair coal mine underground roadways and complete an operation of supplementary driving of bolts and cables, conforms to an environmental protection develop-ment concept of a green and low-carbon technology of coal mine machinery, and is very wide in disclosure prospect.

2. By means of providing parts of the drill boom mecha-nism, the bolting machine can be easily and conveniently adjusted up and down, left and right, front and back in all directions, thereby greatly improving the operation range of the bolting machine, reducing the labor intensity of the workers and improving the operation efficiency.

3. By means of folding the working platform set and providing the working platform set on the platform scalable set of the drill boom mechanism, the working platform set can be synchronously lifted along with the lifting of the drill boom mechanism, so as to facilitate the bolt construction of an operator and improve the safety.

4. By adopting the mine explosion-proof diesel engine trackless rubber-tyred vehicle chassis, a motor is powered by a battery to drive the roof bolter to travel, which is envi-ronmental-friendly and low in noise. Through full hydraulic control, the operation is simple, the failure rate is low, and the maintenance is convenient.

BRIEF DESCRIPTION OF THE DRAWINGS

The accompanying drawings of the specification, which constitute a part of the present disclosure, are intended to provide a further understanding of the present disclosure, and the exemplary embodiments of the present disclosure and the description thereof are intended to explain the present disclosure and do not constitute an undue limitation on the present disclosure. In the accompanying drawings.

Figure 1:
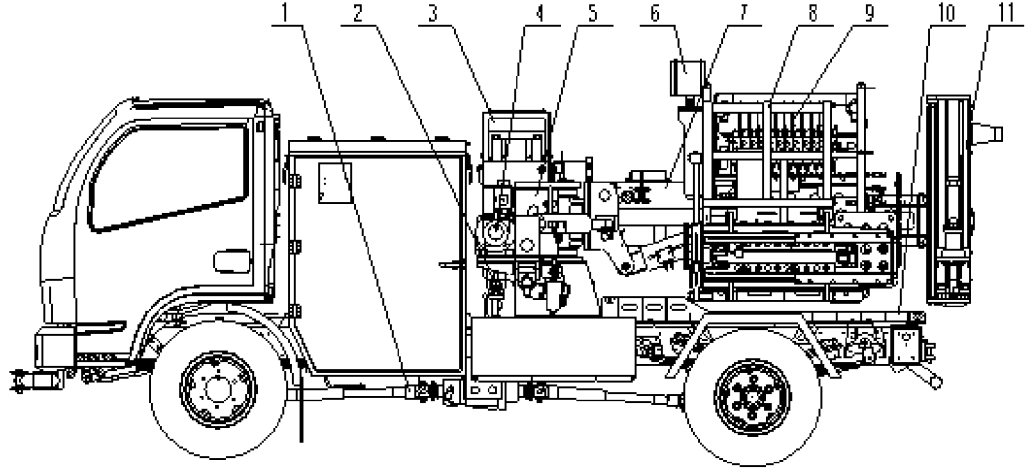
FIG. 1 illustrates a side view when a roof bolter is in a contracted state according to an embodiment of a dual-power hydraulic roof bolter of the present disclosure.

Herein, the above-mentioned accompanying drawings include the following reference signs.

1. Electric vehicle chassis; 2. Water system; 3. Oil tank set; 4. Pneumatic pumping station set; 5. Machine base part; 6. Electrical system; 7. Drill boom mechanism; 8. Working platform set; 9. Operating platform; 10. Bin set; 11. Bolting machine; 12. Hydraulic system; 71. Drill boom rotary seat; 72. Drill boom scalable set; 73. Strut scalable set; 74. Platform scalable set; 75. Drill boom support cylinder; 76. Drill boom swing cylinder; 81. Lighting lamp set; 82. Left guard rail; 83. Left overturning platform; 84. Fixed platform; 85. Folding oil cylinder; 86. Right overturning platform; 87. Right guard rail; and 88. Lifting rail.

DETAILED DESCRIPTION OF THE EMBODIMENTS

It is to be noted that embodiments in the present disclo-sure and features in the embodiments can be combined under the condition of no conflicts. The present disclosure is described below with reference to the drawings and in conjunction with the embodiments in detail.

It is to be noted that, unless otherwise specified, all technical and scientific terms used in the present disclosure have the same meaning as commonly understood by those of ordinary in the art of the present disclosure.

In the present disclosure, unless otherwise stated, the used orientation words such as "up and down" are generally for the direction shown in the drawings, or for the vertical, perpendicular or gravity direction. Similarly, for the conve-nience of understanding and description, "left and right" usually refer to the left and right shown in the drawings, and "inside and outside" refer to the inside and outside relative to the contour of each part. However, the above-mentioned orientation words are not intended to limit the present disclosure.

Figure 2:
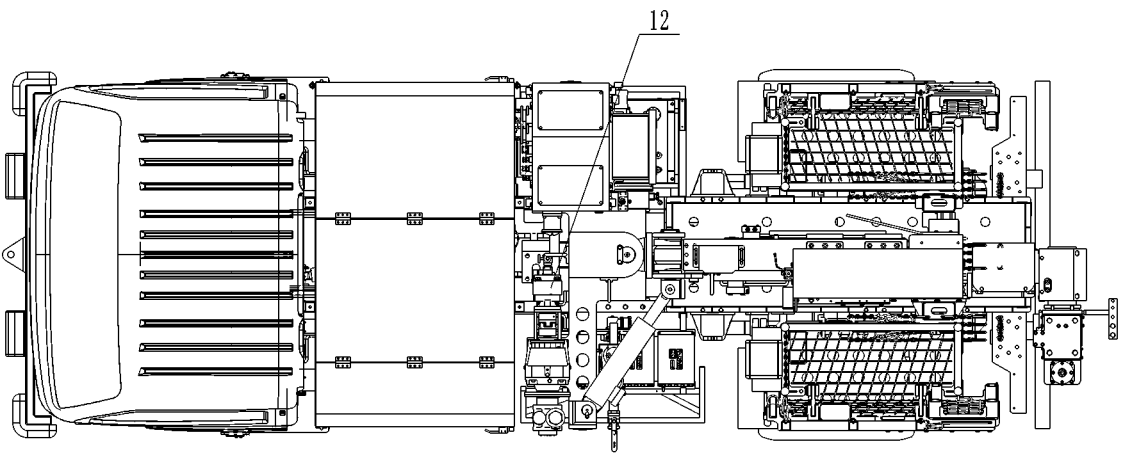
FIG. 2 illustrates a top view when a roof bolter of a dual-power hydraulic roof bolter in FIG. 1 is in a contracted state.
Figure 3:
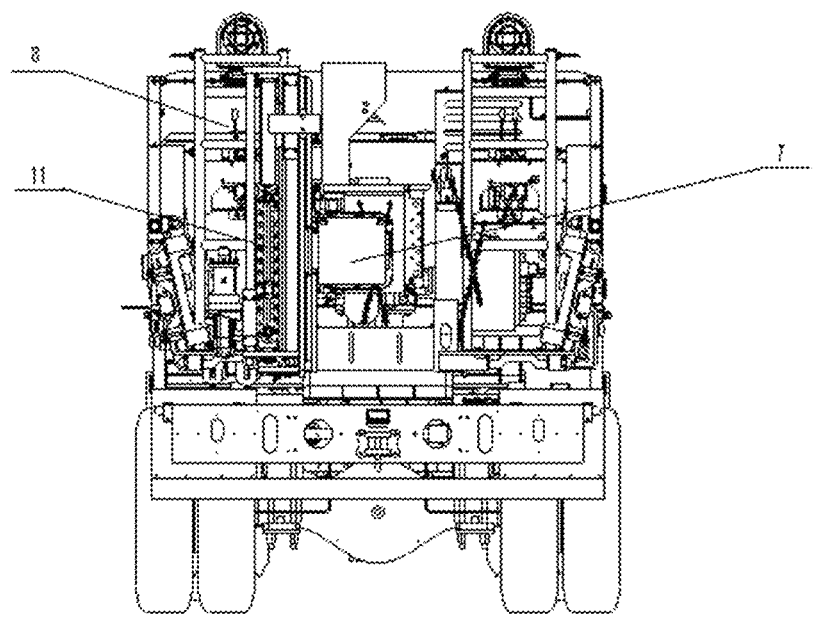
FIG. 3 illustrates a right side view when a roof bolter of a dual-power hydraulic roof bolter in FIG. 1 is in a con-tracted state.

As shown in FIGS. 1 to 3, in order to achieve mechanized operations of roadway repair and supplementary driving of bolts and cables, and achieve zero pollution emission, a dual-power hydraulic roof bolter in the present embodiment includes an electric vehicle chassis 1, a water system 2, an oil tank set 3, a pneumatic pumping station set 4, a machine base part 5, an electrical system 6, a drill boom mechanism 7, a working platform set 8, an operating platform 9, a bin set 10, a bolting machine 11 and a hydraulic system 12.

The electric vehicle chassis 1 is located at the bottom of the roof bolter, and the machine base part 5 is fixed thereon. The electric vehicle chassis 1 in the present embodiment is an explosion-proof lithium ion battery trackless rubber-tyred vehicle chassis which is a new power type trackless rubber-tyred vehicle using a battery as a power source. The hydrau-lic system 12 is connected with the electric vehicle chassis 1, the drill boom mechanism 7, the bolting machine 11, the working platform set 8 and the operating platform 9, so as to control the actions of the electric vehicle chassis 1, the drill boom mechanism 7, the bolting machine 11, the working platform set 8 and the operating platform 9.

Figure 4:
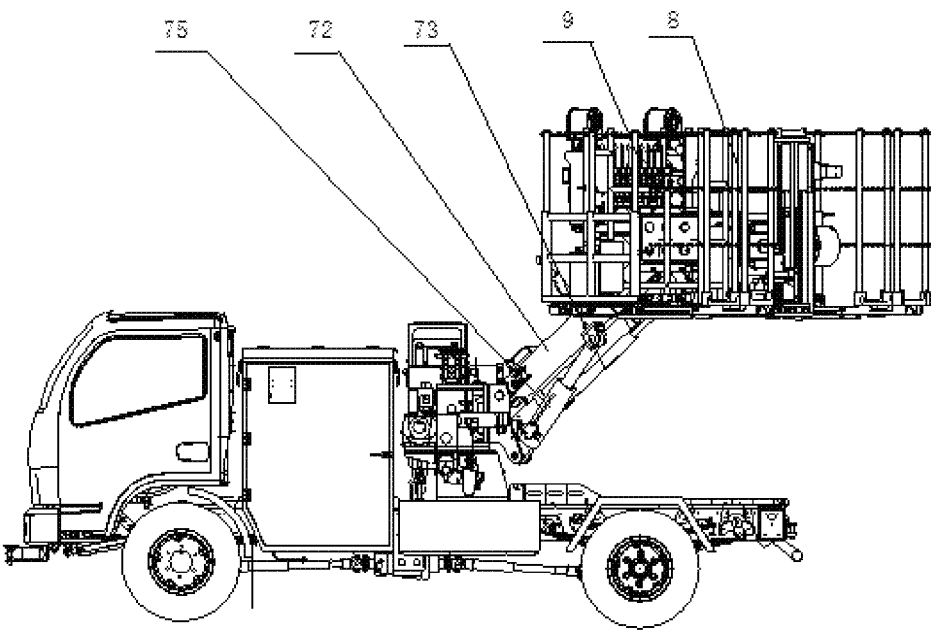
FIG. 4 illustrates a side view when a roof bolter of a dual-power hydraulic roof bolter in FIG. 1 is in an expanded state.

In some embodiments, the drill boom mechanism 7 includes a drill boom rotary seat 71, a drill boom scalable set 72, a strut scalable set 73, a lifting platform, a drill boom support oil cylinder 75 and a drill boom swing cylinder 76. The drill boom rotary seat 71 is rotatably mounted on the machine base part 5, first ends of the drill boom scalable set 72 and the strut scalable set 73 are both connected with the drill boom rotary seat 71 through a first pin shaft, second ends of the drill boom scalable set 72 and the strut scalable set 73 are both connected with the lifting platform through a second pin shaft, the drill boom scalable set 72 and the strut scalable set 73 are provided in parallel, the drill boom scalable set 72 and the strut scalable set 73 form a lifting adjustment set with the drill boom rotary seat 71 and the lifting platform, and the lifting adjustment set is parallelogram-shaped. The lifting adjustment set achieves lifting adjustment through the drill boom support oil cylinder 75, as shown in FIG. 4.

In some embodiments, the lifting platform is a platform scalable set 74, and the bolting machine 11, the working platform set 8 and the operating platform 9 are all provided on an extended platform of the platform scalable set 74. The second ends of the drill boom scalable set 72 and the strut scalable set 73 are both connected with the platform scalable set 74 through the second pin shaft, the drill boom scalable set 72 and the strut scalable set 73 are provided in parallel, and the drill boom scalable set 72 and the strut scalable set 73 form the lifting adjustment set with the drill boom rotary seat 71 and the platform scalable set 74.

Figure 5:
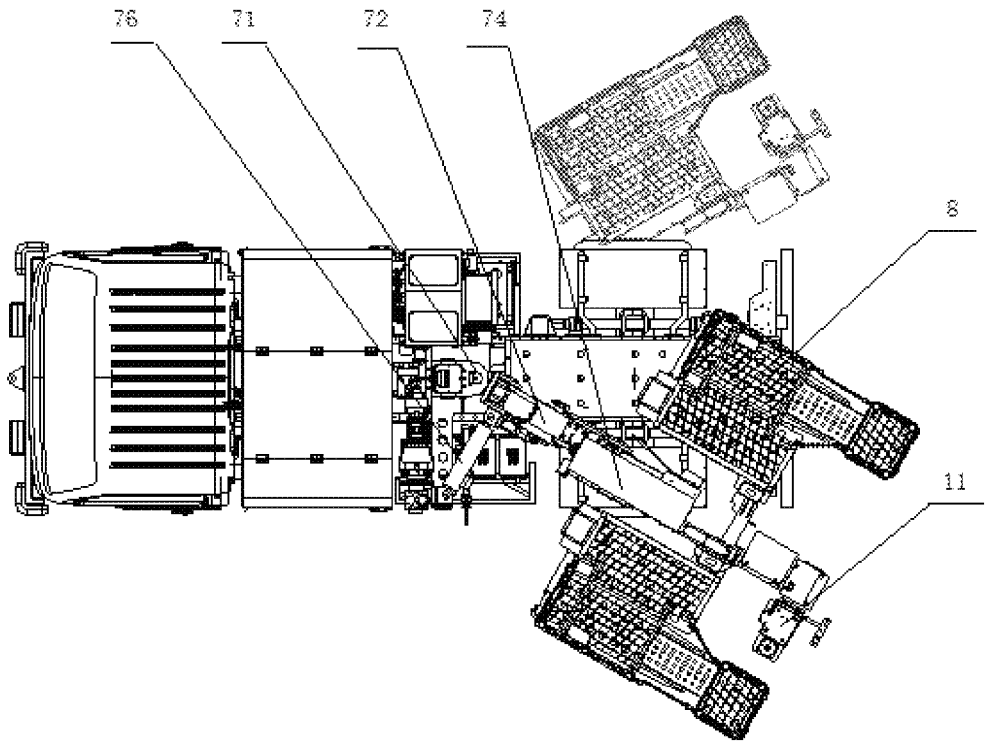
FIG. 5 illustrates a top view of a roof bolter in FIG. 4 in an expanded state.
Figure 6:
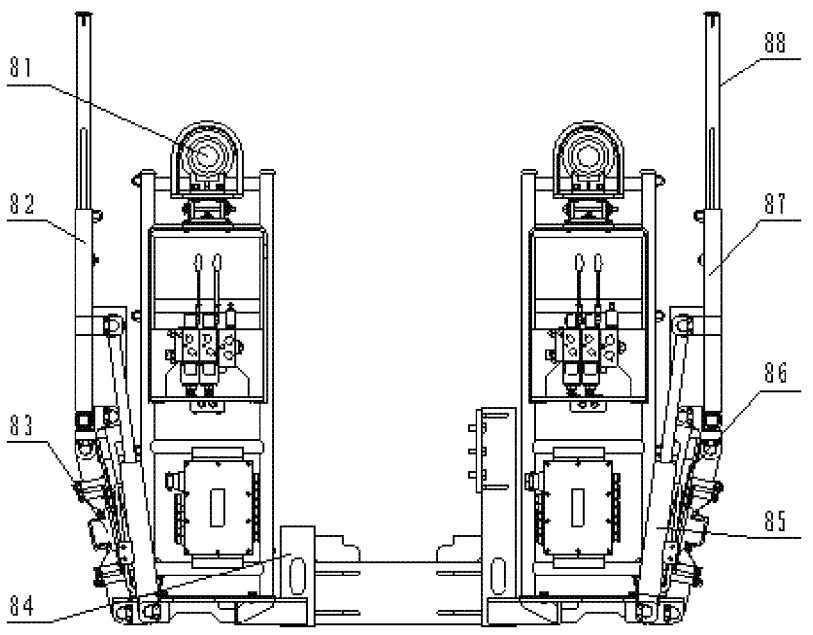
FIG. 6 illustrates a right side view when a working platform set of a dual-power hydraulic roof bolter in FIG. 1 is in a contracted state.
Figure 7:
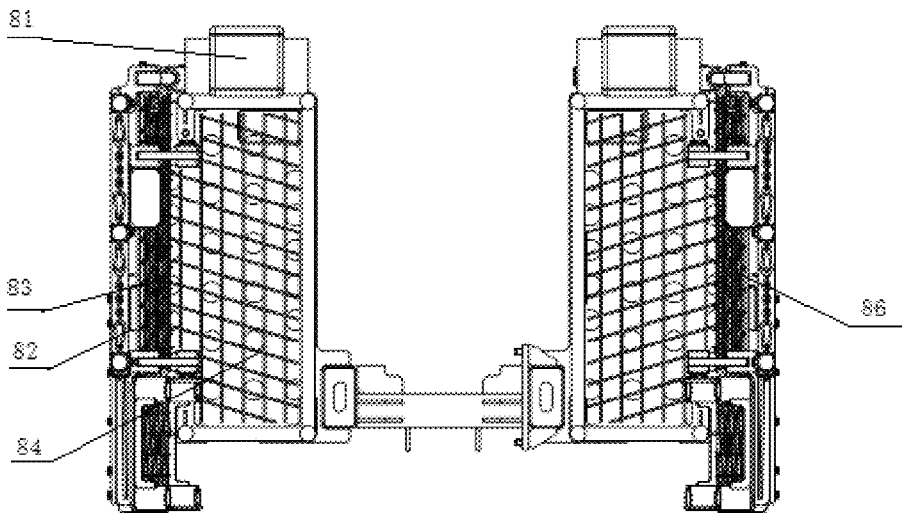
FIG. 7 illustrates a top view when a working platform set in FIG. 6 is in a contracted state.
Figure 8:
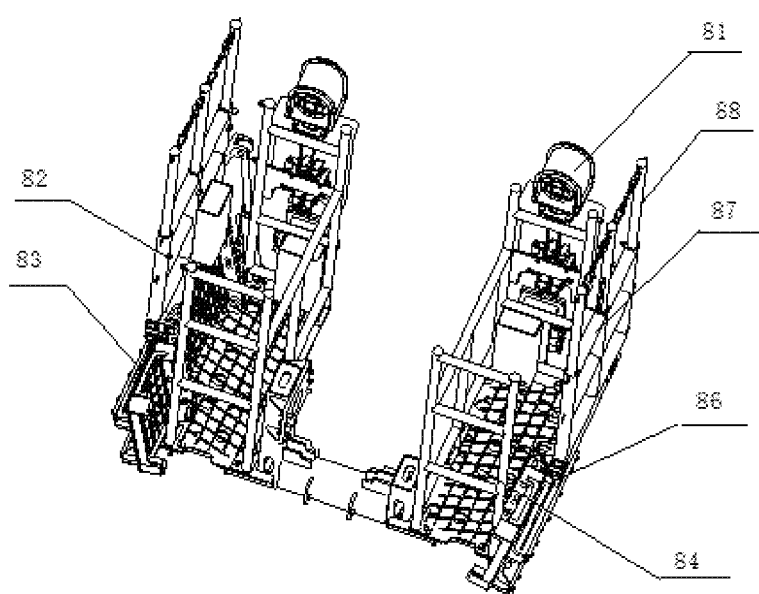
FIG. 8 illustrates a three-dimensional structure diagram when a working platform set of a dual-power hydraulic roof bolter in FIG. 1 is in a contracted state.
Figure 9:
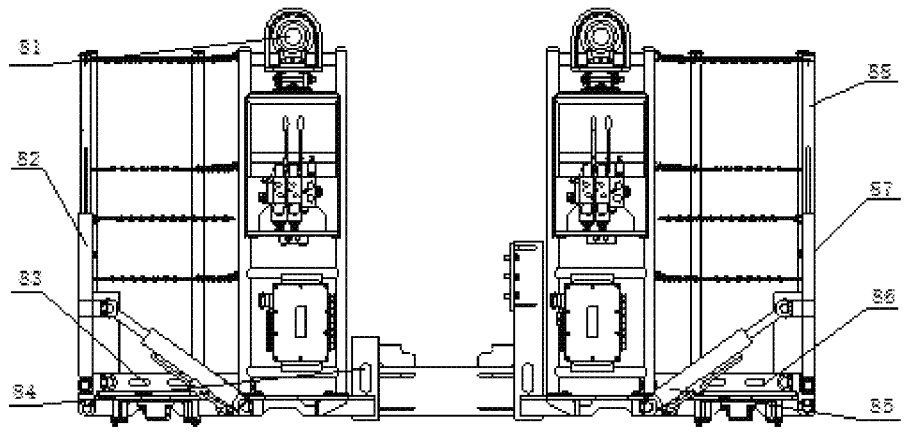
FIG. 9 illustrates a right side view when a working platform set of a dual-power hydraulic roof bolter in FIG. 1 is in an expanded state.
Figure 10:
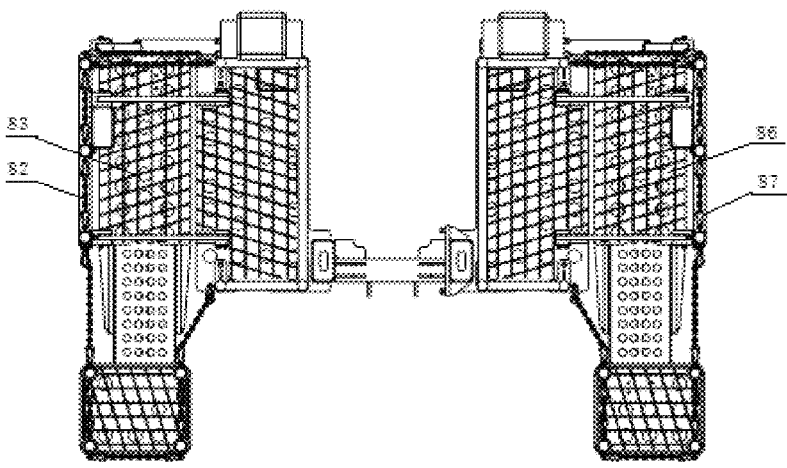
FIG. 10 illustrates a top view when a working platform set in FIG. 9 is in a contracted state.
Figure 11:
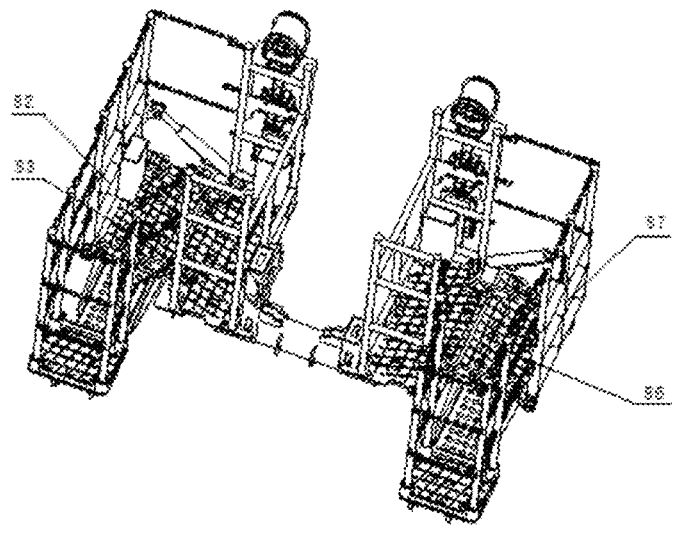
FIG. 11 illustrates a three-dimensional structure diagram when a working platform set of a dual-power hydraulic roof bolter in FIG. 1 is in an expanded state.

In some embodiments, the platform scalable set 74 includes the extended platform which can be driven by telescopic cylinders, and the bolting machine 11 is rotatably provided on the extended platform of the platform scalable set 74 through the swing cylinder, so that the bolting machine can achieve front-rear adjustment in a horizontal direction through the platform scalable set 74, and achieve angle adjustment through the swing cylinder, as shown in FIG. 5. The drill boom swing cylinder 76 is further provided between the drill boom scalable set 72 and the machine base part 5, so that the drill boom rotary seat 71 and the lifting adjustment set are driven to rotate by the drill boom swing cylinder 76, and then the bolting machine 11 is driven to rotate, thereby achieving a wide range of left-right adjustment and lifting adjustment. Then, the drill boom mechanism can drive the bolting machine 11 to achieve bolt construction in all directions through the cooperation action between various parts, thereby greatly improving the operation range.

In some embodiments, the platform scalable set 74 is a fixed lifting platform.

In some embodiments, as shown in FIGS. 6 to 11, the working platform set 8 includes a lighting lamp set 81, a left guard rail 82, a left overturning platform 83, a fixed platform 84, folding oil cylinders 85, a right overturning platform 86, a right guard rail 87 and lifting rails 88. The left overturning platform 83 and the right overturning platform 86 are respectively rotatably provided on two sides of the fixed platform 84, edges of the right overturning platform 83 and the left overturning platform 86 are both provided with the right guard rail 82 and the left guard rail 87, and the left guard rail 82 and the right guard rail 87 are provided with the lifting rails 88, so as to further improve the safety of the guard rails. One end of the folding oil cylinder 85 is connected with the fixed platform 84, and the other end thereof is connected to the guard rail. When a bolt construction operation is required, the overturning platforms can be opened to be horizontal by scalable the folding oil cylinders 85, so as to enlarge a work surface and facilitate the work of an operator.

In some embodiments, the fixed platform 84 is provided on the platform scalable set 74, and the right overturning platform 86 and the left overturning platform 83 are overturned by the folding cylinders 85.

In some embodiments, the ends of the left overturning platform 83 and the right overturning platform 86 are both provided with telescopic platforms which can slide horizontally, and the telescopic platforms are horizontally expanded and contracted through the telescopic cylinders, namely the expansion and contraction of the telescopic platforms. The telescopic platforms can be expanded when operating so as to increase the operation area, and be contracted when not operating so as to save the volume. The working platform set 8 is mounted on the platform scalable set 74 of the drill boom mechanism 7 to perform a lifting movement and a side-to-side movement along with the drill boom mechanism 7, and maintain a height corresponding to the bolting machine 11, so as to facilitate the work of the operator.

In some embodiments, the bolting machine 11 includes a primary oil cylinder, a secondary oil cylinder, a slideway, a rotating mechanism, a rotating mechanism assembly and a chain assembly. The rotating mechanism assembly is located above the slideway, and the rotating mechanism, the primary oil cylinder and the secondary oil cylinder are connected together through the chain assembly and the slideway, so as to achieve a bolt and cable operation.

In some embodiments, the dual-power hydraulic roof bolter further includes a bin set 10. The bin set 10 is provided on the electric vehicle chassis 1 and arranged below the drill boom mechanism 7. The oil tank set 3 is provided on the machine base part 5, and the operating platform 9 is provided on the working platform set 8 and moves along with the drill boom mechanism 7, so as to achieve synchronous movement with the working platform set 8 and facilitate the operation of the operator.

In some embodiments, the water system 2 is composed of a ball valve, a filter, a pressure reducing valve, a safety valve, a cooler, etc. and supplies water to at least one actuator of the electric vehicle chassis 1, the drill boom mechanism 7, the working platform set 8 and the bolting machine 11.

In some embodiments, the electrical system 6 includes a control box, an explosion-proof junction box, a remote control transmitter, a remote control receiver, a control switch, a mining voice light signal apparatus, a mining intrinsic safety type display control box, a mining explosion-proof pressure transmitter, a working lighting lamp, a coal mine light rubber jacketed flexible cable, etc. so as to provide electrical energy for various actuating parts of the roof bolter.

In some embodiments, the hydraulic system 12 includes an oil tank, a hydraulic oil pump, a motor, a hydraulic cylinder, a balance valve, an oil pipe seat, a joint, a hydraulic pipeline, a cooler, a control valve located on the hydraulic pipeline, etc. The hydraulic pipeline includes a pipeline connecting an outlet of the oil tank to the hydraulic oil pump, and a pipeline connecting an outlet of the hydraulic oil pump to the drill boom mechanism 7, the working platform set 8 and the bolting machine 11. The dual-power hydraulic roof bolter provides power for the hydraulic oil pump through an electric vehicle chassis transfer case driving hydraulic pump, and then transmits the power to each actuator (such as the electric vehicle chassis 1, the drill boom mechanism 7, the working platform set 8 and the bolting machine 11) through the hydraulic pipeline, so that the above-mentioned power cooperates with the control valve corresponding to each actuator to complete drilling and other actions.

In some embodiments, the power of the hydraulic system 12 can also be a pneumatic pumping station set 4. The pneumatic pumping station set 4 is composed of an air source processing piece, a pneumatic motor, a speed reducer, a wind motor driving hydraulic pump, etc. The pneumatic pumping station set 4 is mounted on the machine base part 5 and can also provide power for at least one actuator of the electric vehicle chassis 1, the drill boom mechanism 7, the working platform set 8 and the bolting machine 11.

In some embodiments, the electric vehicle chassis transfer case driving hydraulic pump and the wind motor driving hydraulic pump serve as the independent power sources and are provided in parallel, and both can independently provide power for at least one actuator of the electric vehicle chassis 1, the drill boom mechanism 7, the working platform set 8 and the bolting machine 11.

In some embodiments, when the dual-power hydraulic roof bolter is in a contracted state, the dimension thereof can be contracted to a length of 6100 mm, a width of 2000 mm and a height of 2350 mm, and is suitable for a supporting operation inside a low roadway with a roadway width of 4.0-5.5 m and a height of 3.0-4.2 m.

When the dual-power hydraulic roof bolter travels to a working position to perform the bolt support construction operation, the worker works on the working platform set 8. During the bolt support operation, the drill boom mechanism 7 can achieve up-down adjustment, left-right adjustment, and forward and backward expansion and contraction by controlling the drill boom support oil cylinder at the drill boom mechanism 7, the drill boom swing cylinder, the telescopic cylinders of the platform scalable set, the swing cylinder of the bolting machine and an operating valve of the swing cylinder, so that the bolting machine 11 reaches a drilling position, and then the bolt support is completed under the control of the electrical system and the hydraulic system.

In some embodiments, the working platform set 8 is controlled by the corresponding folding cylinders, telescopic cylinders and operating valves of the telescopic cylinders, so that the overturning platforms can be opened to be horizontal and the telescopic platform can be slidably extended, thereby increasing the operating space of the operator.

In some embodiments, the electric vehicle chassis 1 is a mine explosion-proof diesel engine trackless rubber-tyred vehicle chassis, and a power system of the electric vehicle chassis 1 is provided with an energy consumption braking functional module and a downhill control operation module.

In some embodiments, the electric vehicle chassis further includes an automatic gas detection and alarm module connected to the power system.

In some embodiments, the dual-power hydraulic roof bolter has two sets of independent power sources, and the two sets of power sources respectively drive the hydraulic oil pump to supply liquid to a system, and control actuating elements of the mechanical parts through various elements of the hydraulic system, so that the operation is simple, the failure rate is low, and the maintenance is convenient.

In some embodiments, the electrical system of the dual-power hydraulic roof bolter has an explosion-proof function, and all the elements constituting the electrical system have an explosion-proof certificate and a coal security certificate, so as to ensure the safety of the operator when the roof bolter operates.

In some embodiments, the overall mechanism of the dual-power hydraulic roof bolter is reasonable, rigid, able to travel freely and reliably, and adapted to work in harsh environments. The drill boom mechanism is small in size and light in weight to become a very ideal safety support device for coal mine underground mining and excavation, and can achieve the goal of a safe, efficient and mechanized operation in our coal mine industry, and enrich the types of roof bolters applicable to coal mine roadways. According to the present disclosure, a remote control function is also provided for each actuating action of the bolt support, so as to further improve an automatic program.

The double-power hydraulic roof bolter of the present disclosure achieves the mechanized operations of roadway repair and complementary driving of bolts and cables, and achieve zero pollution emission, so as to solve the problems of high labor intensity and low support efficiency of workers, overcome the defects of loud noise and high harmful gas emission of the mine explosion-proof diesel engine trackless rubber-tyred vehicle, and improve the air quality of the coal mine roadways.

It is apparent that the described embodiments are only a part of the embodiments of the present disclosure, and not all of them. All other embodiments obtained by those of ordinary skill in the art based on the embodiments of the present disclosure without creative efforts are within the scope of protection the present disclosure.

What is claimed is:

1. A dual-power hydraulic roof bolter, wherein the dual-power hydraulic roof bolter comprises:

an electric vehicle chassis;

a machine base part;

a drill boom mechanism;

a bolting machine;

a working platform set;

an operating platform; and a hydraulic system, connected with the electric vehicle chassis, the drill boom mechanism, the bolting machine, the working platform set and the operating platform to control the actions of the electric vehicle chassis, the drill boom mechanism, the bolting machine, the working platform set and the operating platform;

the machine base part is disposed on the electric vehicle chassis; the drill boom mechanism is disposed on the machine base part, and the bolting machine, the working platform set and the operating platform are disposed on the drill boom mechanism; and the hydraulic system is independently driven by two sets of power sources respectively, and the two sets of power sources are an electric vehicle chassis transfer case driving hydraulic pump and a wind motor driving hydraulic pump respectively;

wherein the drill boom mechanism comprises a drill boom rotary seat, a drill boom scalable set, a strut scalable set and a lifting platform, and the drill boom rotary seat is rotatably disposed on the machine base part; first ends of the drill boom scalable set and the strut scalable set are both connected with the drill boom rotary seat through a first pin shaft, second ends of the drill boom scalable set and the strut scalable set are both connected to the lifting platform through a second pin shaft, the drill boom scalable set and the strut scalable set are disposed in parallel;

wherein the drill boom scalable set and the strut scalable set form a lifting adjustment set with the drill boom rotary seat and the lifting platform, and the lifting adjustment set is parallelogram-shaped.

2. The dual-power hydraulic roof bolter as claimed in claim 1, wherein the bolting machine is rotatably disposed on the lifting platform by a swing cylinder; a drill boom swing cylinder is disposed between the drill boom scalable set and the machine base part, and the drill boom swing cylinder drive the drill boom rotary seat and the lifting adjustment set to rotate, so as to drive the bolting machine to rotate.

3. The dual-power hydraulic roof bolter as claimed in claim 2, wherein the lifting adjustment set achieves lifting adjustment through a drill boom support oil cylinder.

4. The dual-power hydraulic roof bolter as claimed in claim 2, wherein the electric vehicle chassis is a mine explosion-proof lithium ion battery trackless rubber-tyred vehicle chassis, and a power system of the electric vehicle chassis comprises an energy consumption braking functional module and a downhill control operation module.

5. The dual-power hydraulic roof bolter as claimed in claim 1, wherein the lifting platform is a platform scalable set; the bolting machine, the working platform set and the operating platform are all disposed on an extended platform of the platform scalable set.

6. The dual-power hydraulic roof bolter as claimed in claim 5, wherein the working platform set comprises a fixed platform, a left overturning platform and a right overturning platform, the left overturning platform and the right overturning platform are respectively rotatably disposed on two sides of the fixed platform; the dual-power hydraulic roof bolter comprises a right guard rail and a left guard rail, the right guard rail is disposed on edges of the right overturning platform, and the left guard rail is disposed on the left overturning platform; the fixed platform is disposed on the platform scalable set.

7. The dual-power hydraulic roof bolter as claimed in claim 6, wherein the dual-power hydraulic roof bolter comprises telescopic platforms, the telescopic platforms are disposed on ends of the right overturning platform and the left overturning platform, and the telescopic platforms are horizontally expanded and contracted through telescopic cylinders.

8. The dual-power hydraulic roof bolter as claimed in claim 7, wherein the dual-power hydraulic roof bolter comprises lifting rails, the lifting rails are disposed on upper ends of the right guard rail and the left guard rail.

9. The dual-power hydraulic roof bolter as claimed in claim 8, wherein the right overturning platform and the left overturning platform are overturned by folding oil cylinders.

10. The dual-power hydraulic roof bolter as claimed in claim 5, wherein the electric vehicle chassis is a mine explosion-proof lithium ion battery trackless rubber-tyred vehicle chassis, and a power system of the electric vehicle chassis comprises an energy consumption braking functional module and a downhill control operation module.

11. The dual-power hydraulic roof bolter as claimed in claim 6, wherein the electric vehicle chassis is a mine explosion-proof lithium ion battery trackless rubber-tyred vehicle chassis, and a power system of the electric vehicle chassis comprises an energy consumption braking functional module and a downhill control operation module.

12. The dual-power hydraulic roof bolter as claimed in claim 7, wherein the electric vehicle chassis is a mine explosion-proof lithium ion battery trackless rubber-tyred vehicle chassis, and a power system of the electric vehicle chassis comprises an energy consumption braking functional module and a downhill control operation module.

13. The dual-power hydraulic roof bolter as claimed in claim 8, wherein the electric vehicle chassis is a mine explosion-proof lithium ion battery trackless rubber-tyred vehicle chassis, and a power system of the electric vehicle chassis comprises an energy consumption braking functional module and a downhill control operation module.

14. The dual-power hydraulic roof bolter as claimed in claim 1, wherein the dual-power hydraulic roof bolter further comprises a bin set, and the bin set is disposed on the electric vehicle chassis.

15. The dual-power hydraulic roof bolter as claimed in claim 14, wherein the electric vehicle chassis is a mine explosion-proof lithium ion battery trackless rubber-tyred vehicle chassis, and a power system of the electric vehicle chassis comprises an energy consumption braking functional module and a downhill control operation module.

16. The dual-power hydraulic roof bolter as claimed in claim 1, wherein the electric vehicle chassis is a mine explosion-proof lithium ion battery trackless rubber-tyred vehicle chassis, and a power system of the electric vehicle chassis comprises an energy consumption braking functional module and a downhill control operation module.

17. The dual-power hydraulic roof bolter as claimed in claim 16, wherein the electric vehicle chassis further comprises an automatic gas detection and alarm module, and the automatic gas detection and alarm module is connected with the power system.

18. The dual-power hydraulic roof bolter as claimed in claim 1, wherein the electric vehicle chassis is a mine explosion-proof lithium ion battery trackless rubber-tyred vehicle chassis, and a power system of the electric vehicle chassis comprises an energy consumption braking functional module and a downhill control operation module.

* * * * *